US007298932B2

(12) United States Patent
Wakao

(10) Patent No.: US 7,298,932 B2
(45) Date of Patent: Nov. 20, 2007

(54) CONTROL APPARATUS AND CONTROL METHOD FOR IMAGE SENSING APPARATUS

(75) Inventor: Satoru Wakao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 10/834,662

(22) Filed: Apr. 29, 2004

(65) Prior Publication Data
US 2004/0218053 A1    Nov. 4, 2004

(51) Int. Cl.
*G06K 9/60* (2006.01)
(52) U.S. Cl. .................................. 382/305; 348/231.2
(58) Field of Classification Search ................ 382/100; 348/207.99, 231.2, 231.6; 713/177, 176; 380/200
See application file for complete search history.

(56) References Cited

U.S. PATENT DOCUMENTS

| 5,499,294 | A  | * | 3/1996 | Friedman ..................... 713/179 |
| 5,898,779 | A  | * | 4/1999 | Squilla et al. ............... 713/176 |
| 6,889,324 | B1 |   | 5/2005 | Kanai et al. ................. 713/176 |
| 6,968,058 | B1 |   | 11/2005 | Kondoh et al. ............. 380/200 |
| 7,055,034 | B1 | * | 5/2006 | Levy ........................... 713/176 |
| 7,075,571 | B1 | * | 7/2006 | Nakajima et al. ......... 348/231.6 |
| 2002/0001395 | A1 | * | 1/2002 | Davis et al. ................. 382/100 |
| 2002/0051577 | A1 | * | 5/2002 | Kinjo ........................... 382/218 |
| 2002/0114454 | A1 | * | 8/2002 | Hamilton .................... 380/200 |
| 2004/0218064 | A1 |   | 11/2004 | Wakao |

FOREIGN PATENT DOCUMENTS

JP    2001-078142    3/2001
JP    2002-244924    8/2002

OTHER PUBLICATIONS

Schneider et al, "A robust content-based digital signature for image authentication," Proc. ICIP'96, pp. 227-230, Lausanne, Switzerland, Sep. 1996.*
Lu et al, "Structural Digital Signature for Image Authentication:An Incidental Distortion Resistant Scheme", IEEE Transactions on Multimedia, vol. 5, No. 2, Jun. 2003.*
English Abstract for Japanese Patent Application Laid-Open 2001-078142.
English Abstract for Japanese Patent Application Laid-Open 2002-244924.

* cited by examiner

*Primary Examiner*—Samir Ahmed
*Assistant Examiner*—Andrae Allison
(74) *Attorney, Agent, or Firm*—Morgan & Finnegan LLP

(57) ABSTRACT

A control apparatus which controls an image sensing apparatus, includes a determination unit, a command generating unit and a command sending unit. The determination unit determines whether or not verification data has been added to an image file, the verification data being used to determine whether or not a digital image in the image file has been altered. The command generating unit generates a command that requests the image sensing apparatus to change the contents of the image file. The command sending unit sends the command to the image sensing apparatus if the determination unit determines that the verification data has not been added to the image file, the command being not sent to the image sensing apparatus if the determination unit determines that the verification data has been added to the image file.

12 Claims, 18 Drawing Sheets

FIG. 10

| MAC(10) | | | | | | | | | |
|---|---|---|---|---|---|---|---|---|---|
| DIGITAL SIGNATURE(7) | | OTHERS(3) | | | | | | | |

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ☺ | IMG_0001.JPG | 2002.12.01 10:40:17 | 1/800 | 5.6 | 100 | 1M | EOS XX | FE0001 | |
| ☺☺ | IMG_0002.TIF | 2002.12.01 10:43:32 | 1/800 | 5.6 | 100 | 2M | EOS XX | FE0001 | |
| ☾ | IMG_0003.JPG | 2002.12.01 10:46:12 | 1/1000 | 5.6 | 400 | 8M | EOS XX | FE0001 | |
| .... | .... | .... | .... | .... | .... | .... | .... | .... | .... |

START VERIFICATION

TOTAL NUMBER OF FILES : 20

FIG. 11

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ☾ | IMG_0021.JPG | 2002.12.11 13:43:27 | 1/800 | 5.6 | 100 | 1M | EOS XX | FE0001 | |
| 👥 | IMG_0022.TIF | 2002.12.11 13:43:32 | 1/800 | 5.6 | 100 | 2M | EOS XX | FE0001 | |
| ☀ | IMG_0023.JPG | 2002.12.11 13:46:36 | 1/1000 | 5.6 | 400 | 8M | EOS XX | FE0001 | |
| ..... | ..... | ..... | ..... | ..... | ..... | ..... | ..... | ..... | ..... |

MAC(10)  DIGITAL SIGNATURE(7)  OTHERS(3)

TOTAL NUMBER OF FILES : 20

START VERIFICATION

FIG. 14

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
|  | IMG_0001.JPG | 2002.12.01 10:40:17 | 1/800 | 5.6 | 100 | 1M | EOS XX | FE0001 | OK |
|  | IMG_0002.TIF |  |  |  |  |  |  |  | NG |
|  | IMG_0003.JPG | 2002.12.01 10:46:12 | 1/1000 | 5.6 | 400 | 8M | EOS XX | FE0001 | OK |
|  | ..... | ..... | ..... | ..... | ..... | ..... | ..... | ..... | ..... |

MAC(10)  DIGITAL SIGNATURE(7)  OTHERS(3)

TOTAL NUMBER OF FILES : 20

START VERIFICATION

FIG. 15

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ) | IMG_0021.JPG | 2002.12.11 13:43:27 | 1/800 | 5.6 | 100 | 1M | EOS XX | FE0001 | OK |
| ⊠ | IMG_0022.TIF | | | | | | | | NG |
| ☼ | IMG_0023.JPG | 2002.12.11 13:46:36 | 1/1000 | 5.6 | 400 | 8M | EOS XX | FE0001 | OK |
| .... | .... | .... | .... | .... | .... | .... | .... | .... | .... |

MAC(10)  DIGITAL SIGNATURE(7)  OTHERS(3)

TOTAL NUMBER OF FILES : 20

START VERIFICATION

CONTROL APPARATUS AND CONTROL METHOD FOR IMAGE SENSING APPARATUS

FIELD OF THE INVENTION

The present invention relates to a control apparatus and control method which control an image sensing apparatus.

BACKGROUND OF THE INVENTION

At present, there is proposed a system which verifies alteration of image data generated by an image sensing apparatus such as a digital camera (see, e.g., U.S. Pat. No. 5,499,294 and Japanese Patent Application Laid-Open No. 2002-244924).

Japanese Patent Application Laid-Open No. 2001-78142 (reference 1) discloses an image sensing apparatus having a function of embedding verification data (data necessary to determine whether an image file has been altered: called "feature data" in reference 1) in a sensed image file, and an apparatus which inhibits any change of the contents of an image file when verification data is embedded in the image file.

However, reference 1 does not consider any arrangement which prevents the image sensing apparatus from changing the contents of an image file (with verification data) in accordance with an instruction from an external control apparatus.

SUMMARY OF THE INVENTION

The present invention has been made to overcome the conventional drawbacks, and has as its main object to prevent an image sensing apparatus from changing the contents of an image file (with verification data) in accordance with an instruction from a control apparatus.

According to an aspect of the present invention, a control apparatus which controls an image sensing apparatus, comprising: generation unit adapted to generate an instruction which requests the image sensing apparatus to perform predetermined processing for an image file; and determination unit adapted to determine whether verification data has been added to the image file, wherein generation of the instruction is controlled in accordance with a determination result of the determination unit.

According to another aspect of the present invention, a control method of controlling an image sensing apparatus, comprising steps of: generating an instruction which requests the image sensing apparatus to perform predetermined processing for an image file; determining whether verification data has been added to the image file; and controlling generation of the instruction in accordance with a determination result of the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing an example of a list window (before verification) for an "MAC" group;

FIG. 11 is a view showing an example of a list window (before verification) for a "digital signature" group;

FIG. 14 is a view showing an example of a list window (after verification) for the "MAC" group;

FIG. 15 is a view showing an example of a list window (after verification) for the "digital signature" group;

DETAILED DESCRIPTION OF THE PREFERRED EMBODIMENTS

Preferred embodiments of the present invention will now be described in detail in accordance with the accompanying drawings.

First Embodiment

Figure 1:
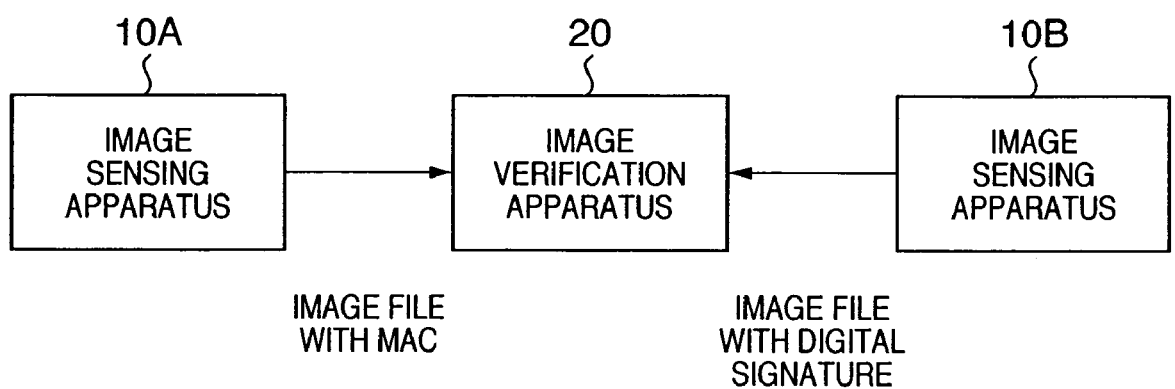
FIG. 1 is a block diagram showing the main building components of an image verification system according to the first embodiment.

The main building components of an image verification system according to the first embodiment of the present invention will be explained with reference to FIG. 1.

An image sensing apparatus 10A generates an image file with an MAC (Message Authentication Code) from digital image data of an object, and records the generated image file with the MAC on, e.g., a removable recording medium (e.g., a memory card) or the recording medium of an external apparatus. The image sensing apparatus 10A can be implemented by an apparatus such as a digital camera, a digital video camera, a portable terminal (for example, PDA, cell phone, or the like) with a camera function, a scanner, a copying machine, or a facsimile apparatus.

An image sensing apparatus 10B generates an image file with a digital signature from digital image data of an object, and records the generated image file with the digital signature on, e.g., a removable recording medium (e.g., a memory card) or the recording medium of an external apparatus. Similar to the image sensing apparatus 10A, the image sensing apparatus 10B can be implemented by an apparatus such as a digital still camera, a digital video camera, a portable terminal (PDA, cell phone, or the like) with a camera function, a scanner, a copying machine, or a facsimile apparatus.

In the following description, the image sensing apparatuses 10A and 10B are digital still cameras or apparatuses having the digital still camera function.

An image verification apparatus 20 has a function of verifying whether an image file with an MAC generated by the image sensing apparatus 10A or an image file with a digital signature generated by the image sensing apparatus 10B has been altered, and a function of notifying the verifier (user) of the verification result. The image verification apparatus 20 also has a function of notifying the verifier of accessory information (for example, thumbnail image, photographing date & time, shutter speed, F-number, ISO sensitivity, model name, manufacturing number, and the like) for an image file with an MAC or digital signature. These functions are realized, for example, by executing an image verification program stored in the program memory of the image verification apparatus 20 and performing necessary control.

Figure 2:
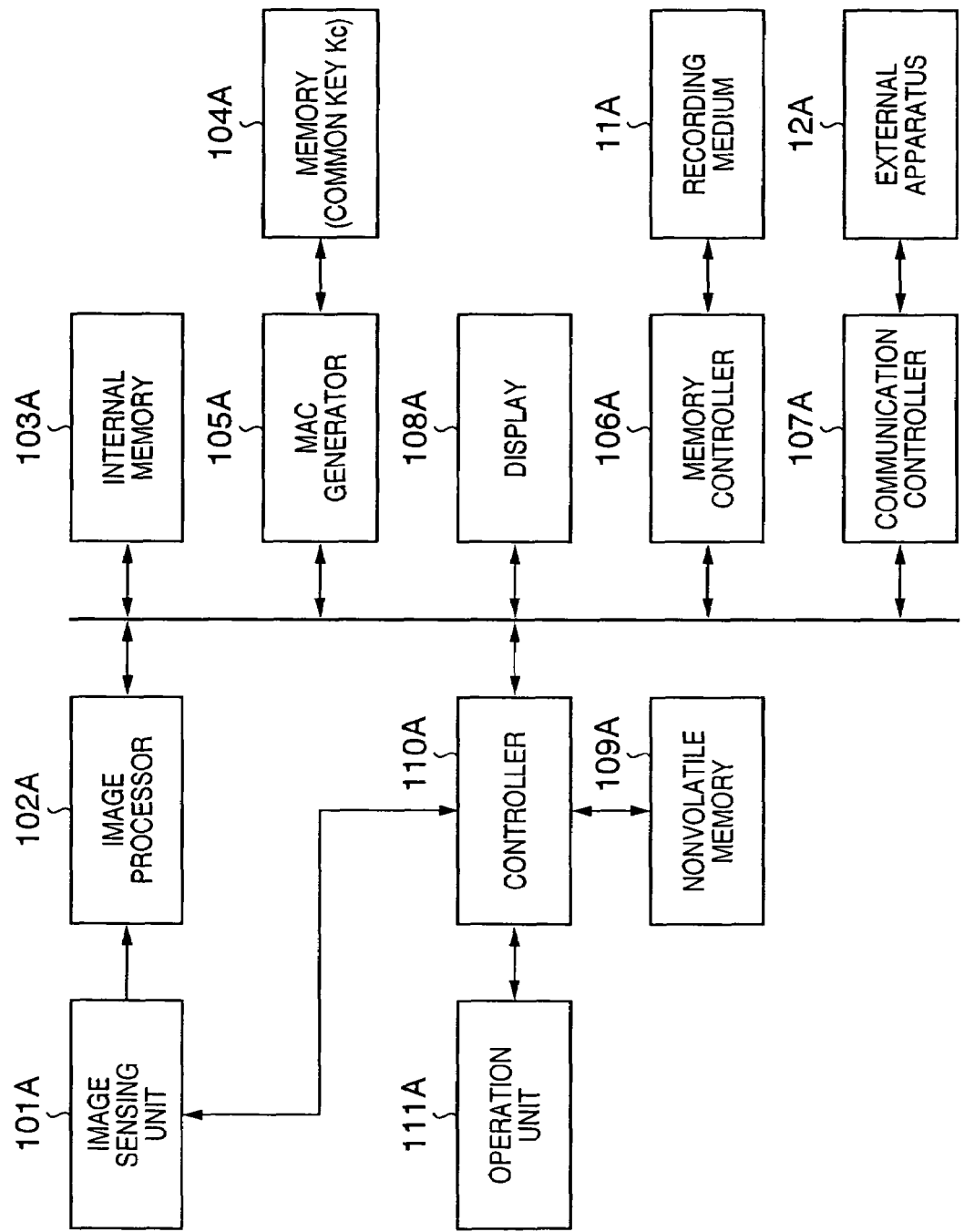
FIG. 2 is a block diagram showing the main building components of an image sensing apparatus 10A.
Figure 3:
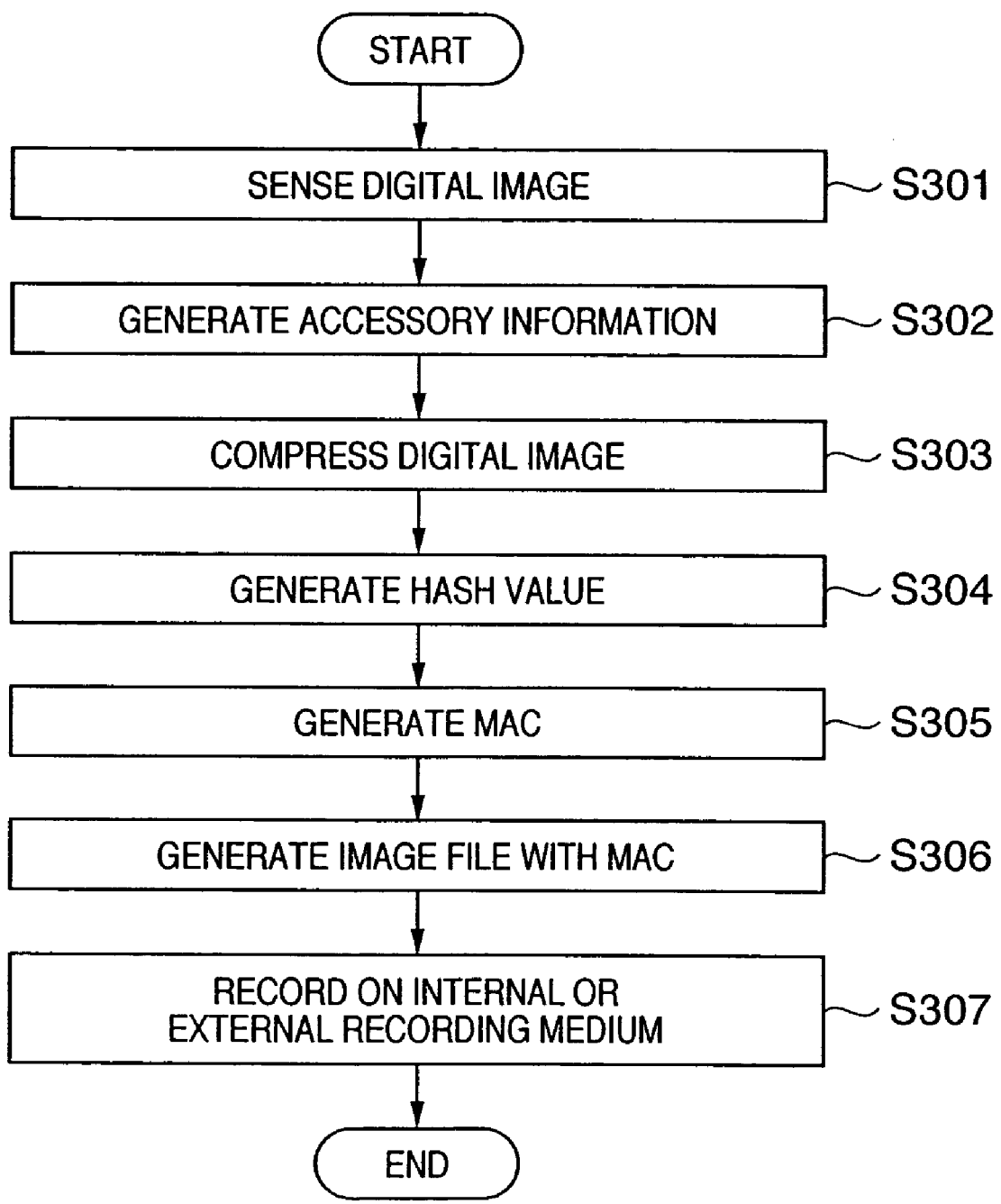
FIG. 3 is a flow chart for explaining processing of generating an image file with an MAC.

Processing of generating an image file with an MAC will be explained with reference to FIGS. 2 and 3. FIG. 2 is a block diagram showing the main building components of the image sensing apparatus 10A. FIG. 3 is a flow chart for explaining MAC-attached image file generation processing executed by the image sensing apparatus 10A. Processing shown in FIG. 3 is realized when a controller 110A having a CPU controls functional units shown in FIG. 2 in accordance with a program stored in, for example, a nonvolatile memory 109A.

Step S301: the user manipulates an operation unit 111A having a shutter button, lens zoom key, and the like, and inputs a photographing instruction to the controller 110A. An image sensing unit 101A having a lens, lens driving circuit, image sensing element, and the like senses an object in accordance with an instruction from the controller 110A, and outputs a digital image.

Step S302: the controller 110A generates accessory information (for example, thumbnail image, photographing date & time, shutter speed, F-number, ISO sensitivity, and the like) of the digital image sensed by the image sensing unit 101A, and stores the generated accessory information in an internal memory 103A.

Step S303: an image processor 102A determines an image recording format selected by manipulating the operation unit 111A by the user before photographing.

When the image recording format is, e.g., a JPEG format, the image processor 102A reads out, from the nonvolatile memory 109A, image adjustment parameters selected by manipulating the operation unit 111A by the user before photographing. In the first embodiment, pieces of information for adjusting, e.g., the contrast, sharpness (edge emphasis), color density, color temperature, color space, compression ratio, and size (number of pixels) of a digital image after image sensing will be called "image adjustment parameters".

The image processor 102A adjusts the digital image sensed by the image sensing unit 101A in accordance with the image adjustment parameters read out from the nonvolatile memory 109A. The image processor 102A compresses the adjusted digital image in accordance with the JPEG format, and writes the compressed digital image in the internal memory 103A.

When the image recording format is, e.g., a RAW format, the image processor 102A compresses the digital image sensed by the image sensing unit 101A according to a predetermined lossless compression method without any adjustment in accordance with the image adjustment parameters in the nonvolatile memory 109A. The image processor 102A writes the compressed digital image in the internal memory 103A.

Step S304: an MAC generator 105A generates a hash value (also called digest data) for the accessory information generated in step S302 and the digital image processed in step S303. That is, the first embodiment verifies both the digital image and its accessory information. Examples of a hash function necessary to generate a hash value are MD5, SHA1, and RIPEMD.

Step S305: the MAC generator 105A converts the hash value into an MAC by using a common key Kc stored in advance in a memory 104A formed by, e.g., a rewritable nonvolatile memory. The MAC generator 105A stores the MAC in the internal memory 103A. The MAC is information necessary to verify whether accessory information and a digital image have been altered. In other words, the MAC is information necessary to verify whether a digital image and accessory information are pieces of original information.

The common key Kc is information corresponding to the common key of common key cryptography (which is cryptography using the same key as encryption and decryption keys and is also called secret key cryptography or symmetric key cryptography). The common key Kc is information which must be managed in secret in the image sensing apparatus 10A.

Figure 4:
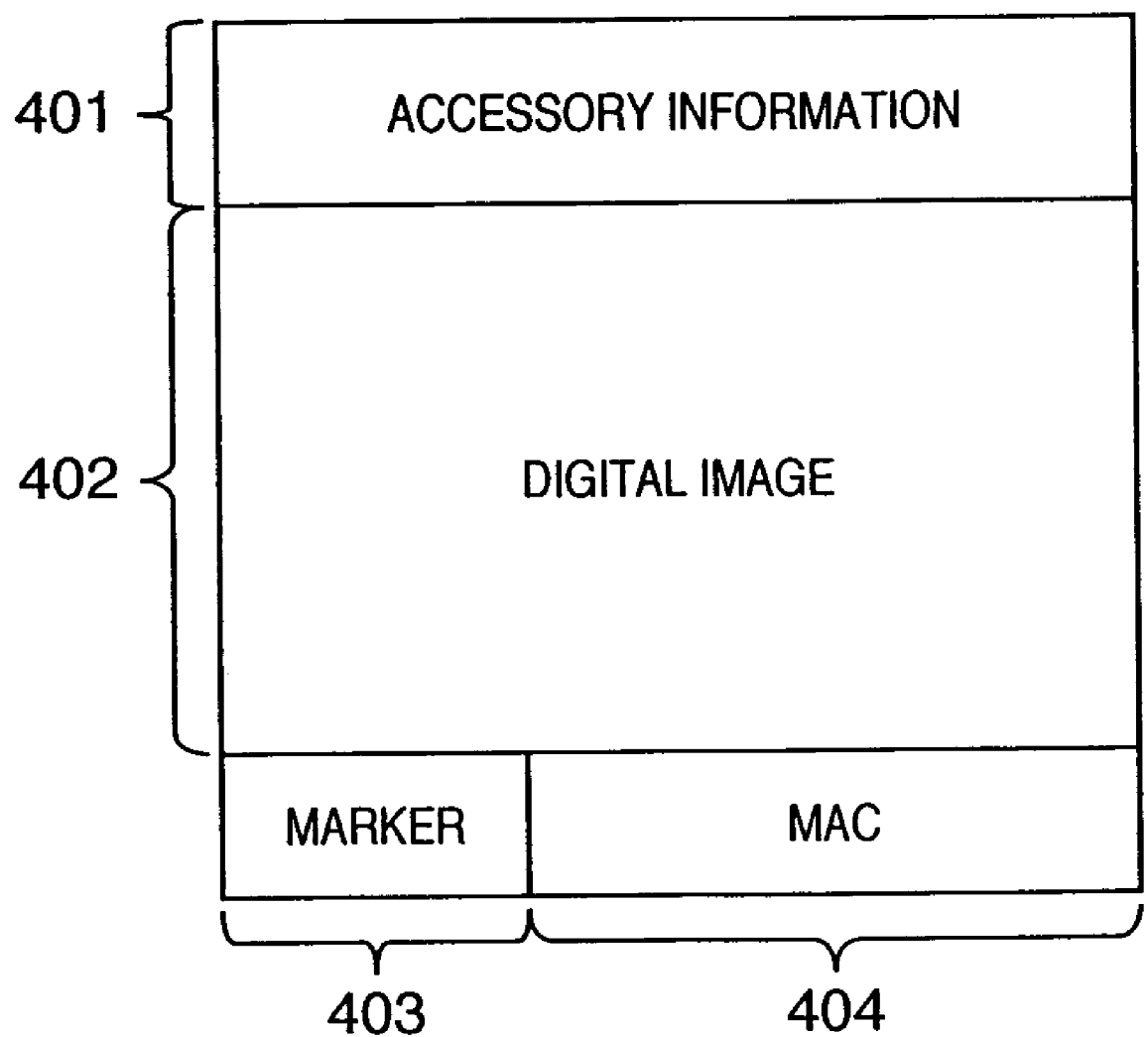
FIG. 4 is a view showing an example of the structure of an image file with an MAC.

Step S306: the controller 110A generates an image file with an MAC by using the internal memory 103A. FIG. 4 shows an example of the structure of an image file with an MAC.

In FIG. 4, an area 401 stores accessory information generated in step S302. That is, the area 401 stores information (for example, thumbnail image, photographing date & time, shutter speed, F-number, ISO sensitivity, and the like) on an image file, and information (for example, model name, manufacturing number, and the like) on an apparatus which has generated the image file. In the first embodiment, a number which specifies an apparatus that has generated an image file will be called a "manufacturing number". An area 402 stores a digital image processed in step S303. That is, the area 402 stores an original image. An area 403 contains a marker representing the type of verification data present in an area 404. In this case, the marker represents an MAC. The area 404 stores an MAC obtained in step S305. The area 404 can be set between the areas 401 and 402 or in the area 401.

Step S307: when the recording destination selected by manipulating the operation unit 111A by the user before photographing is a recording medium 11A, a memory controller 106A writes in the recording medium 11A the image file with the MAC generated in step S306. In the first embodiment, the recording medium 11A is a removable recording medium such as a memory card. When the recording destination selected by manipulating the operation unit 111A by the user before photographing is an external apparatus 12A, a communication controller 107A writes in the recording medium of the external apparatus 12A the image file with the MAC generated in step S306. A display 108A displays the reduced image of the image file with the MAC generated in step S306.

Figure 5:
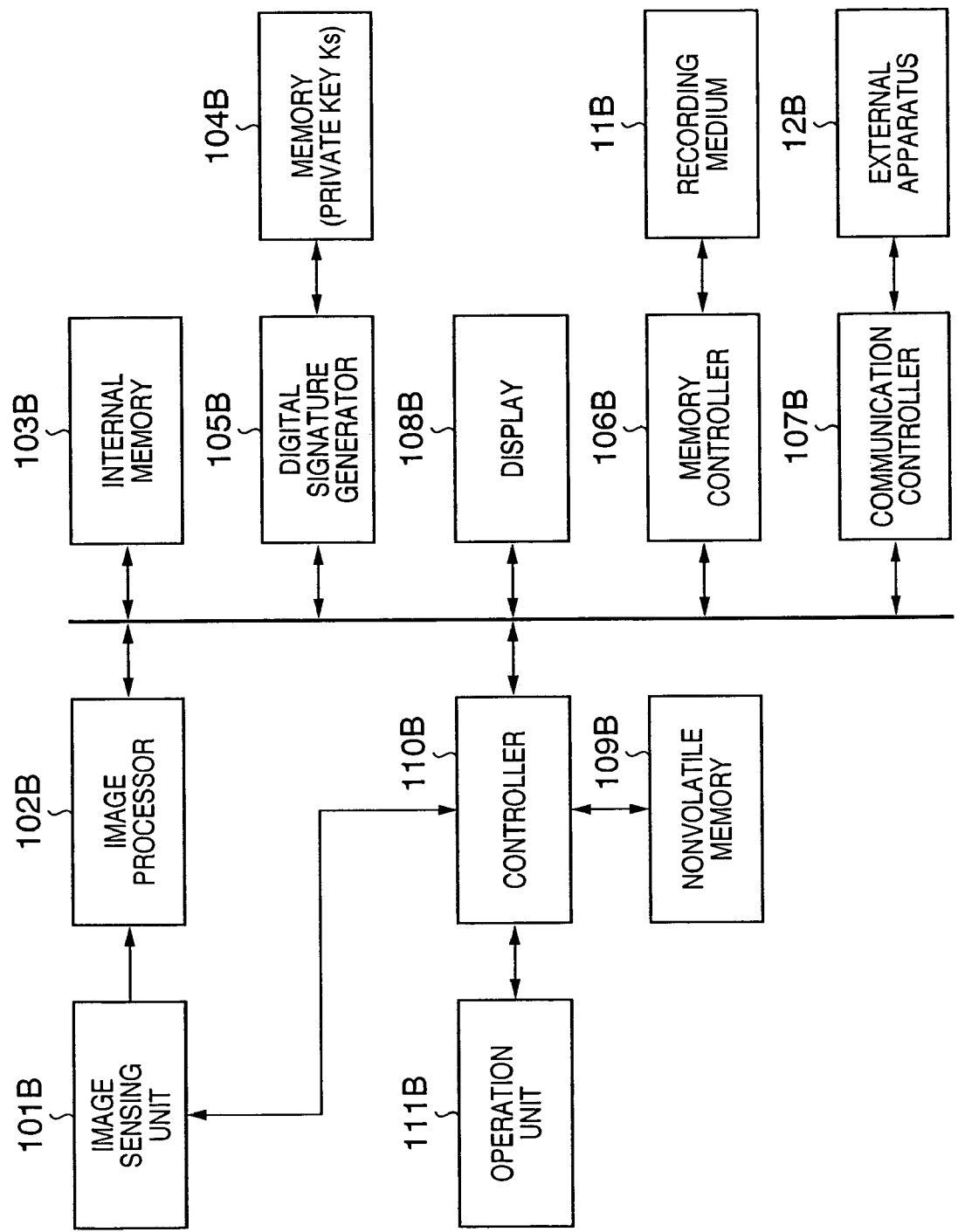
FIG. 5 is a block diagram showing the main building components of an image sensing apparatus 10B.
Figure 6:
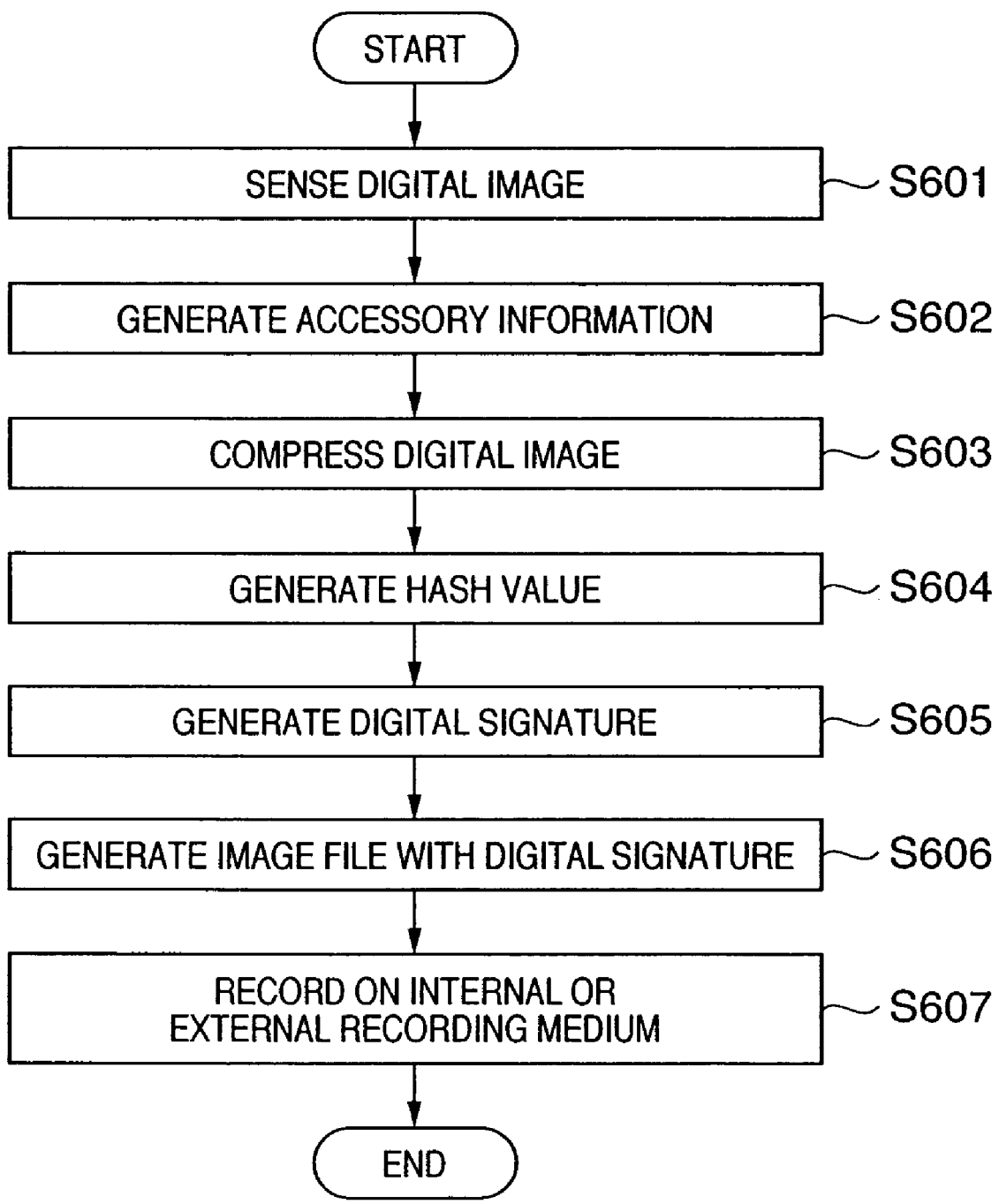
FIG. 6 is a flow chart for explaining processing of generating an image file with a digital signature.

Processing of generating an image file with a digital signature will be explained with reference to FIGS. 5 and 6. FIG. 5 is a block diagram showing the main building components of the image sensing apparatus 10B. FIG. 6 is a flow chart for explaining processing of generating an image file with a digital signature. Processing shown in FIG. 6 is realized when a controller 110B controls functional units shown in FIG. 5 in accordance with a program stored in a nonvolatile memory 109B.

Step S601: the user manipulates an operation unit 111B having a shutter button, lens zoom key, and the like, and inputs a photographing instruction to the controller 110B. An image sensing unit 101B having a lens, lens driving circuit, image sensing element, and the like senses an object in accordance with an instruction from the controller 110B, and outputs a digital image.

Step S602: the controller 110B generates accessory information (for example, thumbnail image, photographing date & time, shutter speed, F-number, ISO sensitivity, and the like) of the digital image sensed by the image sensing unit 101B, and stores the generated accessory information in an internal memory 103B.

Step S603: an image processor 102B determines an image recording format selected by manipulating the operation unit 111B by the user before photographing.

When the image recording format is, e.g., a JPEG format, the image processor 102B reads out, from the nonvolatile memory 109B, image adjustment parameters selected by manipulating the operation unit 111B by the user before photographing. In the first embodiment, pieces of information for adjusting, e.g., the contrast, sharpness (edge emphasis), color density, color temperature, color space, compression ratio, and size (number of pixels) of a digital image after image sensing will be called "image adjustment parameters".

The image processor 102B adjusts the digital image sensed by the image sensing unit 101B in accordance with the image adjustment parameters read out from the nonvolatile memory 109B. The image processor 102B compresses the adjusted digital image in accordance with the JPEG format, and writes the compressed digital image in the internal memory 103B.

When the image recording format is, e.g., a RAW format, the image processor 102B compresses the digital image sensed by the image sensing unit 101B according to a predetermined lossless compression method without any adjustment in accordance with the image adjustment parameters in the nonvolatile memory 109B. The image processor 102B writes the compressed digital image in the internal memory 103B.

Step S604: a digital signature generator 105B generates a hash value (also called digest data) for the accessory information generated in step S602 and the digital image processed in step S603. Similar to the image sensing apparatus 10A, the image sensing apparatus 10B verifies both the digital image and its accessory information. Examples of a hash function necessary to generate a hash value are MD5, SHA1, and RIPEMD.

Step S605: the digital signature generator 105B converts the hash value into a digital signature by using a private key Ks stored in advance in a memory 104B formed by, e.g., a rewritable nonvolatile memory. The digital signature generator 105B stores the digital signature in the internal memory 103B. The digital signature is information necessary to verify whether accessory information and a digital image have been altered. In other words, the digital signature is information necessary to verify whether a digital image and accessory information are pieces of original information.

The first embodiment adopts the private key Ks to generate a digital signature. The private key Ks is information corresponding to the private key of public key cryptography (which is cryptography using different encryption and decryption keys and is also called asymmetric key cryptography). The private key Ks is information which must be managed in secret in the image sensing apparatus 10B.

Figure 7:
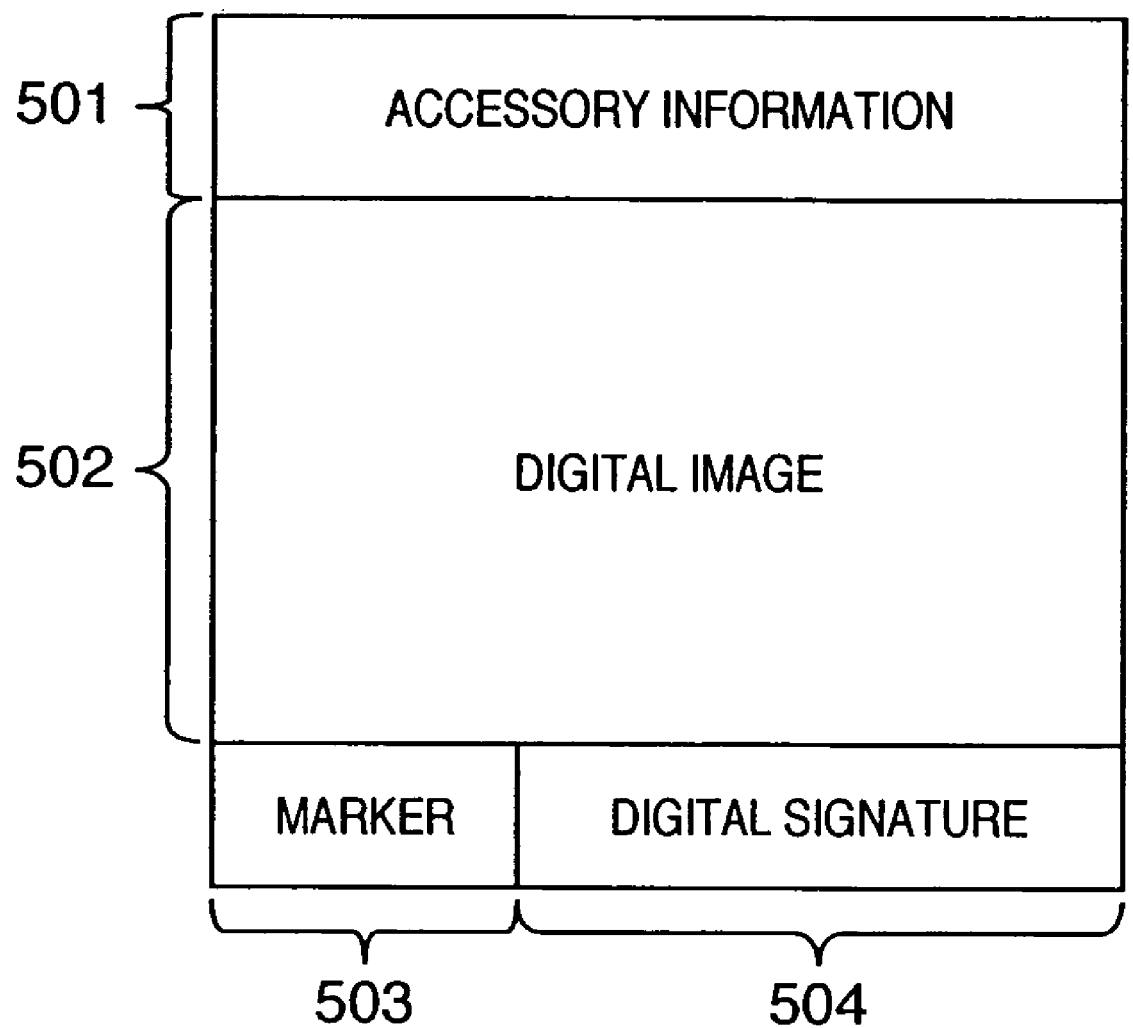
FIG. 7 is a view showing an example of the structure of an image file with a digital signature.

Step S606: the controller 110B generates an image file with a digital signature by using the internal memory 103B. FIG. 7 shows an example of the structure of an image file with a digital signature.

In FIG. 7, an area 501 stores accessory information generated in step S602. That is, the area 501 stores information (for example, thumbnail image, photographing date & time, shutter speed, F-number, ISO sensitivity, and the like) on an image file, and information (for example, model name, manufacturing number, and the like) on an apparatus which has generated the image file. An area 502 stores a digital image processed in step S603. That is, the area 502 stores an original image. An area 503 contains a marker representing the type of verification data present in an area 504. In this case, the marker represents a digital signature. The area 504 stores a digital signature obtained in step S605. The area 504 can be set between the areas 501 and 502 or in the area 501.

Step S607: when the recording destination selected by manipulating the operation unit 111B by the user before photographing is a recording medium 11B, a memory controller 106B writes in the recording medium 11B the image file with the digital signature generated in step S606. In the first embodiment, the recording medium 11B is a removable recording medium such as a memory card. When the recording destination selected by manipulating the operation unit 111B by the user before photographing is an external apparatus 12B, a communication controller 107B writes in the recording medium of the external apparatus 12B the image file with the digital signature generated in step S606. A display 108B displays the reduced image of the image file with the digital signature generated in step S606.

Figure 8:
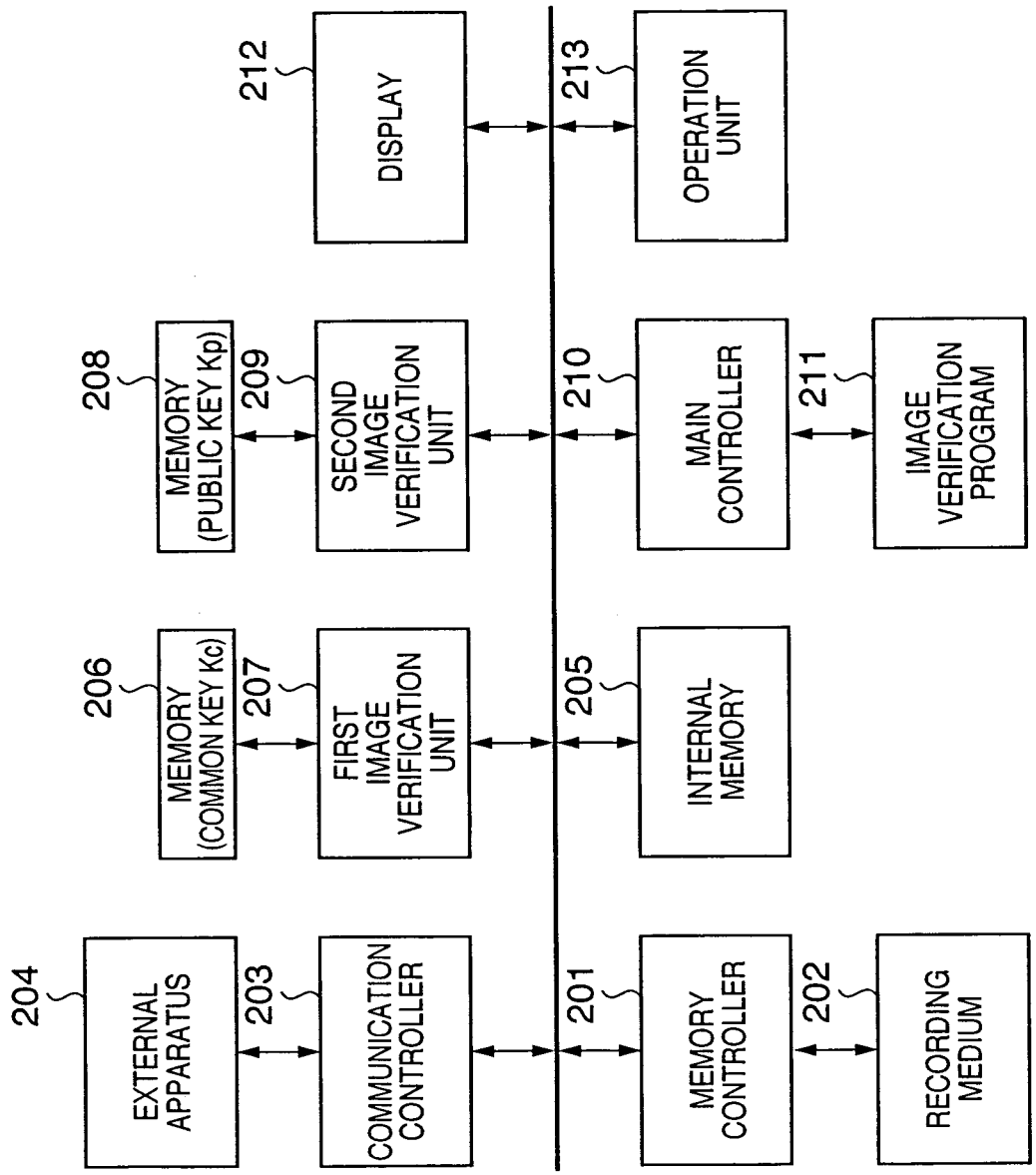
FIG. 8 is a block diagram showing the main building components of an image verification apparatus 20.

The main building components of the image verification apparatus 20 will be explained with reference to FIG. 8.

A memory controller 201 reads out an image file with an MAC or digital signature selected by the verifier from a removable recording medium 202, and stores the readout image file with the MAC or digital signature in an internal memory 205. The removable recording medium 202 may be connectable to the image sensing apparatus 10A or 10B.

A communication controller 203 reads out the image file with the MAC or digital signature selected by the verifier from the recording medium of an external apparatus 204 via a network, and stores the readout image file with the MAC or digital signature in the internal memory 205. The external apparatus 204 may be the image sensing apparatus 10A or 10B.

A memory 206 stores the common key Kc necessary to verify alteration of an image file with an MAC. The common key Kc is the same key as a common key Kc managed in secret by the image sensing apparatus 10A. The common key Kc is also information which must be managed in secret in the image verification apparatus 20. A first image verification unit 207 verifies using the common key Kc in the memory 206 whether the image file with the MAC in the internal memory 205 has been altered.

A memory 208 stores a public key Kp necessary to verify alteration of an image file with a digital signature. The public key Kp corresponds to the private key Ks managed in secret by the image sensing apparatus 10B. The public key Kp is information which corresponds to the public key of public key cryptography and need not be managed in secret. A second image verification unit 209 verifies using the private key Ks in the memory 208 whether an image file with a digital signature in the internal memory 205 has been altered.

A main controller 210 has a microcomputer which executes an image verification program stored in a program memory 211.

A display 212 displays a list window which is generated by the main controller 210 in accordance with the image verification program. Examples of the list window are illustrated in FIGS. 10 and 11. The list window shown in FIG. 10 is a list window for an "MAC" group, and displays, side by side, pieces of accessory information (for example, thumbnail image, photographing date & time, shutter speed, F-number, ISO sensitivity, model name, manufacturing number, and the like), file names, sizes, and verification results for all image files with MACs belonging to the "MAC" group. The list window shown in FIG. 11 is a list window for a "digital signature" group, and contains pieces of accessory information (for example, thumbnail image, photographing date & time, shutter speed, F-number, ISO sensitivity, model name, manufacturing number, and the like), file names, sizes, and verification results for all image files with digital signatures belonging to the "digital signature" group.

As shown in FIGS. 10 and 11, the first embodiment displays the MAC group, digital signature group, and "others" group by assigning different tabs. Although these groups may also be displayed in independent windows, tab display facilitates switching between groups to be displayed.

An operation unit 213 receives an instruction from the verifier, and supplies the received instruction to the main controller 210. The verifier manipulates the operation unit 213 to register an image file with an MAC or digital signature in the image verification apparatus. The verifier manipulates the operation unit 213 to select an image file with an MAC or digital signature to be verified in accordance with the image verification program.

The operation unit 213 includes, e.g., a touch panel arranged on the display 212, and allows clicking a button contained in a GUI displayed on the display 212 or designating switching of a tab to be displayed.

Figure 9:
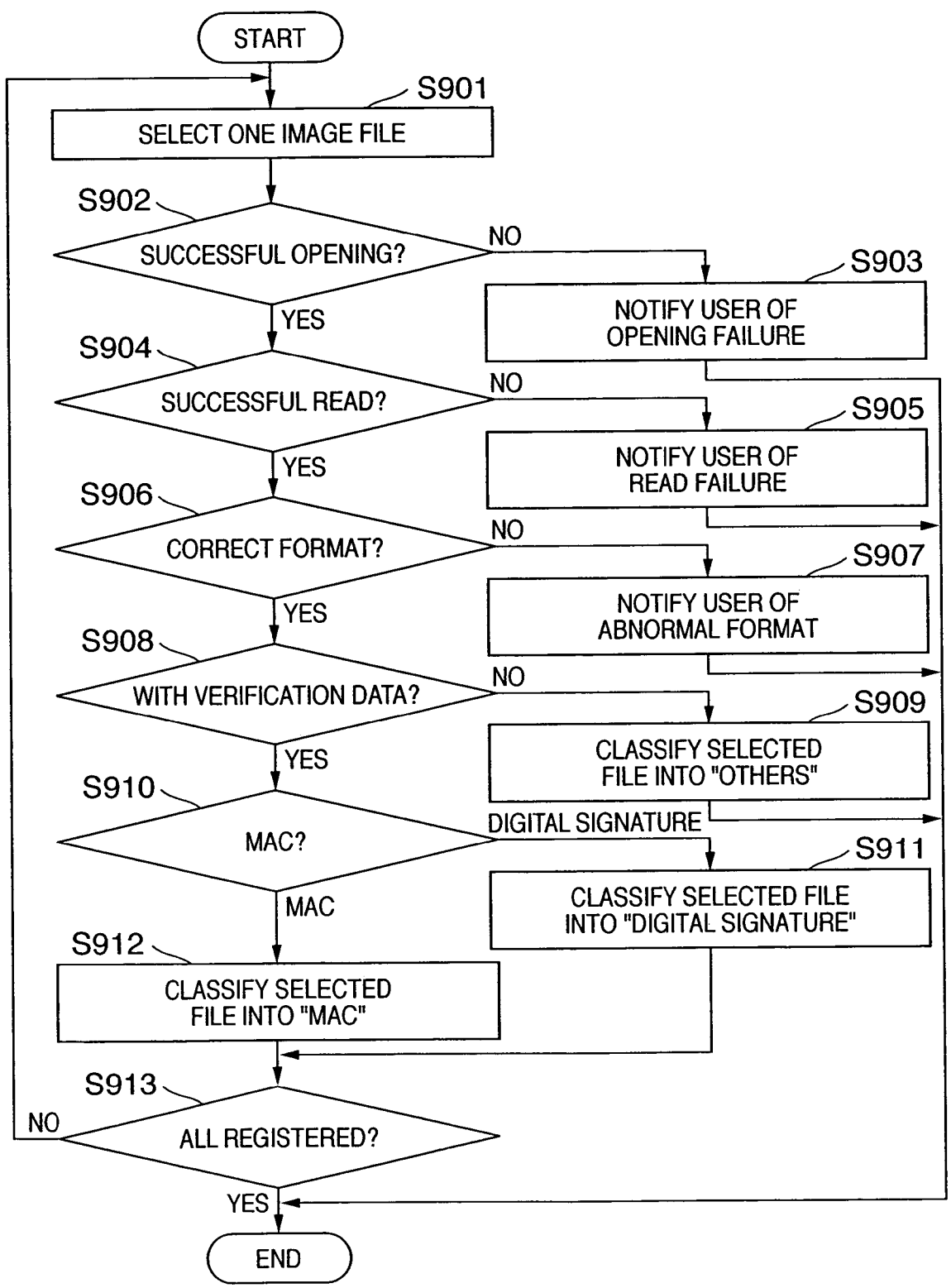
FIG. 9 is a flow chart for explaining image registration processing.

Image registration processing of registering one or more image files selected by the user in the image verification program will be explained with reference to the flow chart of FIG. 9. Image registration processing is controlled in accordance with the image verification program stored in, for example, the program memory 211.

Step S901: the main controller 210 selects one image file in accordance with a predetermined order from one or more image files selected by the user. An image file selected by the main controller 210 will be called a "selected image file". When the user selects a folder, the main controller 210 performs processing on the assumption that all image files in the folder have been selected.

Step S902: the main controller 210 opens the selected image file, and determines whether the selected image file has successfully been opened. If YES in step S902, the flow advances to step S904; if NO, to step S903.

Step S903: the main controller 210 displays on the display 212 a message or sign representing that opening of the selected image file has failed.

Step S904: the main controller 210 reads the selected image file in order to load the selected image file from the removable recording medium 202 or the recording medium of the external apparatus 204 into the internal memory 205. If read of the selected image file fails, the flow advances to step S905; if read of the selected image file is successful, to step S906.

Step S905: the main controller 210 displays on the display 212 a message or sign representing that read of the selected image file has failed.

Step S906: the main controller 210 inspects the file format of the selected image file in the internal memory 205, and determines whether the file format of the selected image file is normal. If YES in step S906, the flow advances to step S908; if NO, to step S907.

Step S907: if NO in step S906, the main controller 210 discards the selected image file in the internal memory 205, and displays on the display 212 a message or sign representing that the file format of the selected image file is abnormal.

Step S908: if YES in step S906, the main controller 210 determines whether verification data (MAC or digital signature in the first embodiment) has been added to the selected image file. If YES in step S908, the flow advances to step S910; if NO, to step S909.

Step S909: if NO in step S908, the main controller 210 classifies the selected image file into the "others" group. The "others" group contains image files having no MAC or digital signature. The main controller 210 registers the accessory information (for example, thumbnail image, photographing date & time, shutter speed, F-number, ISO sensitivity, model name, manufacturing number, and the like), file name, and size of the selected image file in an "others" table within the internal memory 205. The "others" table is a management table which manages image files classified into the "others" group. The main controller 210 displays the thumbnail image, file name, photographing date & time, shutter speed, F-number, ISO sensitivity, size, model name, and manufacturing number of the selected image file side by side in the list window for the "others" group. If no thumbnail image can be extracted from the selected image file, the main controller 210 displays a message or sign representing that no thumbnail image exists, in a column which displays a thumbnail image in the list window. The main controller 210 displays the total number of image files belonging to the "others" group in the list window.

Step S910: the main controller 210 detects the type of verification data added to the selected image file. If the verification data is an MAC, the flow advances to step S912; if the verification data is a digital signature, to step S911.

Step S911: if the verification data of the selected image file is a digital signature, the main controller 210 classifies the selected image file into the "digital signature" group. The "digital signature" group contains image files with digital signatures. The main controller 210 registers the accessory information (for example, thumbnail image, photographing date & time, shutter speed, F-number, ISO sensitivity, model name, manufacturing number, and the like), file name, and size of the selected image file in a "digital signature" table within the internal memory 205. The "digital signature" table is a management table which manages image files classified into the "digital signature" group. For example, as shown in FIG. 11, the main controller 210 displays the thumbnail image, file name, photographing date & time, shutter speed, F-number, ISO sensitivity, size, model name, and manufacturing number of the selected image file side by side in the list window for the "digital signature" group. If the selected image file does not have any thumbnail image, the main controller 210 displays a message or sign representing that no thumbnail image exists, in a column which displays a thumbnail image in the list window. As shown in FIG. 11, the main controller 210 displays the total number (seven in the first embodiment) of image files belonging to the "digital signature" group in the list window, and the total number (20 in the first embodiment) of image files belonging to all the groups.

Step S912: if the verification data of the selected image file is an MAC, the main controller 210 classifies the selected image file into the "MAC" group. The "MAC" group contains image files with MACs. The main controller 210 registers the accessory information (for example, thumbnail image, photographing date & time, shutter speed, F-number, ISO sensitivity, model name, manufacturing number, and the like), file name, and size of the selected image file in an "MAC" table within the internal memory 205. The "MAC" table is a management table which manages image files classified into the "MAC" group. As shown in FIG. 10, the main controller 210 displays the thumbnail image, file name, photographing date & time, shutter speed, F-number, ISO sensitivity, size, model name, and manufacturing number of the selected image file side by side in the list window for the "MAC" group. If the selected image file does not have any thumbnail image, the main controller 210 displays a message or sign representing that no thumbnail image exists, in a column which displays a thumbnail image in the list window. For example, as shown in FIG. 10, the main controller 210 displays the total number (10 in the first embodiment) of image files belonging to the "MAC" group in the list window, and the total number (20 in the first embodiment) of image files belonging to all the groups.

Step S913: the main controller 210 determines whether all image files selected by the user have been registered. If NO in step S913, the main controller 210 returns to step S901.

By the above sequence, the image verification apparatus 20 according to the first embodiment can register one or more image files selected by the user.

Figure 12:
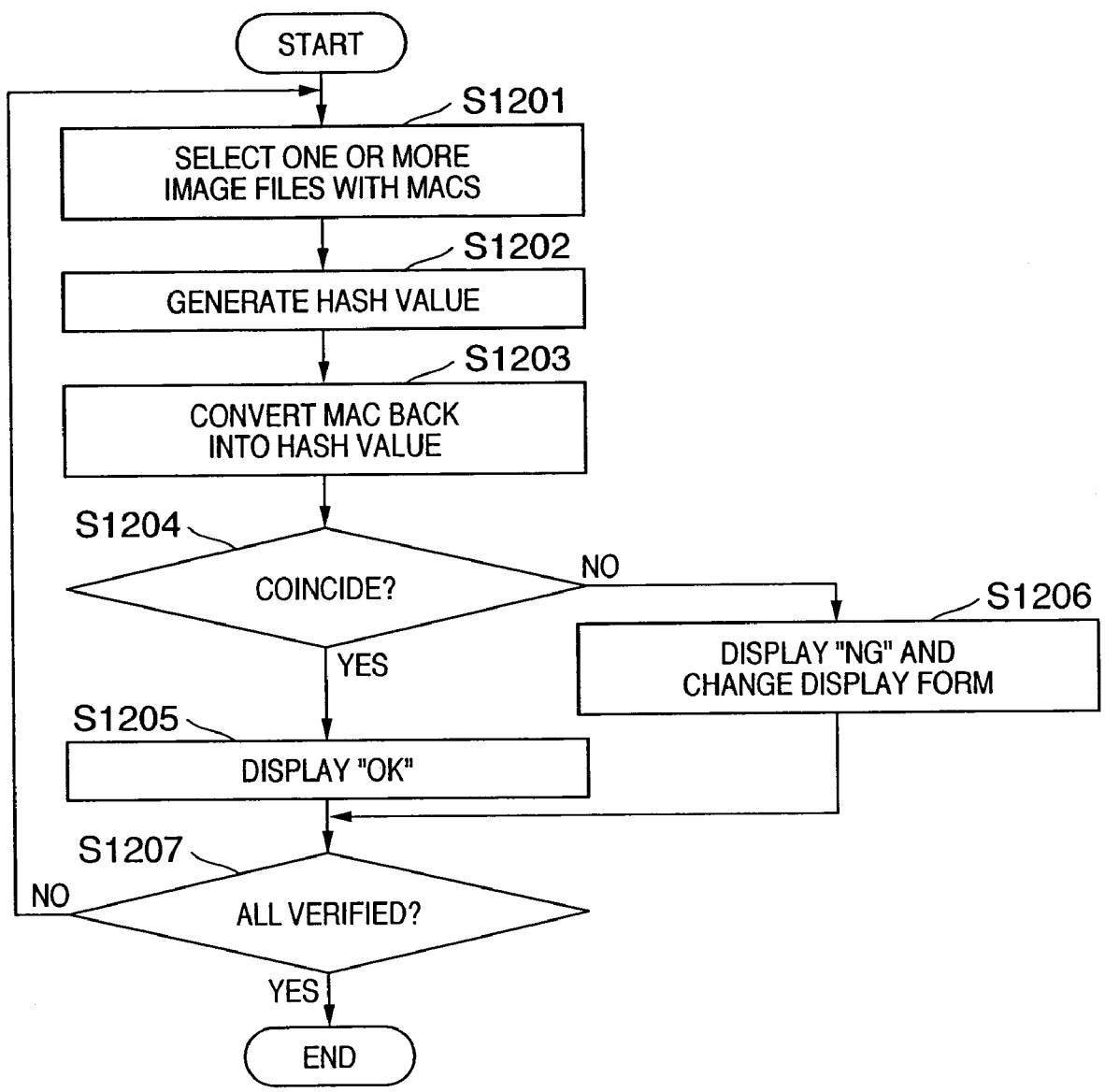
FIG. 12 is a flow chart for explaining the first image verification processing.

The first image verification processing of verifying whether an image file with an MAC has been altered will be described with reference to the flow chart of FIG. 12. The first image verification processing is executed by the first image verification unit 207 of the image verification apparatus 20 under the control of the main controller 210.

Step S1201: the user selects one or more image files with MACs to be verified from the "MAC" group tab in the list window by using the operation unit 213, and designates the start of verification by clicking a "verification start" button shown in FIG. 10. The main controller 210 detects that the "verification start" button has been clicked, and selects one image file with an MAC in accordance with a predetermined order from the one or more image files with MACs selected by the user. An image file with an MAC selected by the main controller 210 will be called a "selected image file".

Step S1202: the main controller 210 loads the selected image file from the removable recording medium 202 or the recording medium of the external apparatus 204 into the internal memory 205, and requests the first image verification unit 207 to verify the selected image file. The first image verification unit 207 extracts accessory information and digital image data from the areas 401 and 402 of the selected image file, and generates their hash value.

Step S1203: the first image verification unit 207 extracts the MAC from the area 404 of the selected image file, and reads out the common key Kc from the memory 206. The first image verification unit 207 converts (decrypts) the MAC back into a hash value by using the common key Kc.

Step S1204: the first image verification unit 207 compares the hash value obtained in step S1202 and the hash value obtained in step S1203, and determines whether the two hash values coincide with each other, in order to verify whether the selected image file has been altered. If the areas 401, 402, and 404 of the selected image file have not been altered, the two hash values coincide with each other. In this case, the first image verification unit 207 determines "not altered", in other words, that the selected image file is an original.

If at least one of the areas 401, 402, and 404 of the selected image file has been altered, the two hash values do not coincide with each other. In this case, the first image verification unit 207 determines "altered", in other words, the selected image file is not an original. The determination result of the first image verification unit 207 is sent to the main controller 210.

Step S1205: if the two hash values coincide with each other, the main controller 210 displays "OK" in the column for the verification result of the selected image file in the list window, as shown in FIG. 14. "OK" is information representing that the selected image file is an image file determined to be "not altered".

Step S1206: if the two hash values do not coincide with each other, the main controller 210 displays "NG" in the verification result column, as shown in FIG. 14. "NG" is information representing that the selected image file is an image file determined to have been "altered". If the selected image file is an image file determined to have been "altered", accessory information in the area 401 may have been altered. To notify the user that accessory information (for example, thumbnail image, photographing date & time, shutter speed, F-number, ISO sensitivity, size, model name, manufacturing number, and the like) obtained from the area 401 of the selected image file may have been altered, the main controller 210 changes the display form of the accessory information in the list window for the selected image file determined to have been "altered".

As change examples of the display form, the first to third display forms will be explained. In the first display form, all pieces of information displayed in the columns for the thumbnail, photographing date & time, shutter speed, F-number, ISO sensitivity, size, model name, and manufacturing number are erased. In the second display form, a sign (e.g., "×") representing the possibility of alteration is added to a thumbnail image displayed in the thumbnail column, and all pieces of information displayed in the columns for the photographing date & time, shutter speed, F-number, ISO sensitivity, size, model name, and manufacturing number are erased, for example, as shown in FIG. 14. In the third display form, a sign (e.g., "×") representing the possibility of alteration is added to all pieces of information displayed in the columns for the thumbnail, photographing date & time, shutter speed, F-number, ISO sensitivity, size, model name, and manufacturing number. Another display form can also be adopted as far as the display form can notify the user that accessory information of the selected image file may have been altered.

Step S1207: the main controller 210 determines whether all image files with MACs selected by the user have been verified. If NO in step S1207, the flow returns to step S1201.

By this processing sequence, the image verification apparatus 20 can verify whether an image file with an MAC selected by the user has been altered.

Figure 13:
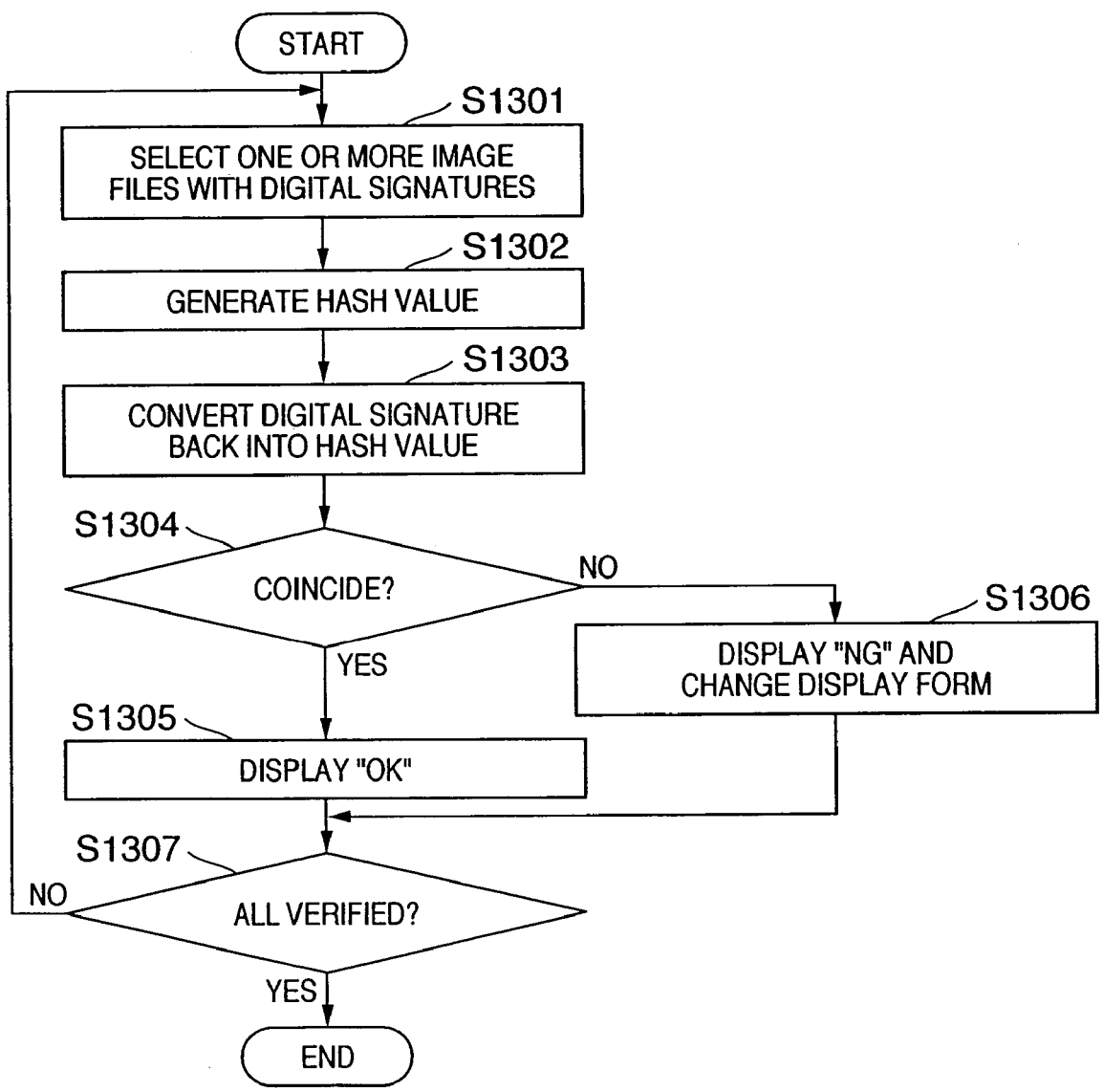
FIG. 13 is a flow chart for explaining the second image verification processing.

The second image verification processing of verifying whether an image file with a digital signature has been altered will be described with reference to the flow chart of FIG. 13. The second image verification processing is executed by the second image verification unit 209 of the image verification apparatus 20 under the control of the main controller 210.

Step S1301: the user selects, from the "digital signature" group, one or more image files with digital signatures to be verified in accordance with the image verification program, and clicks a "verification start" button shown in FIG. 11. The main controller 210 detects that the "verification start" button has been clicked, and selects one image file with a digital signature in accordance with a predetermined order from the one or more image files with digital signatures selected by the user. An image file with a digital signature selected by the main controller 210 will be called a "selected image file".

Step S1302: the main controller 210 loads the selected image file from the removable recording medium 202 or the recording medium of the external apparatus 204 into the internal memory 205, and requests the second image verification unit 209 to verify the selected image file. The second image verification unit 209 extracts accessory information and digital image data from the areas 501 and 502 of the selected image file, and generates their hash value.

Step S1303: the second image verification unit 209 extracts the digital signature from the area 504 of the selected image file, and reads out the public key Kp from the memory 208. The second image verification unit 209 converts (decrypts) the digital signature back into a hash value by using the public key Kp.

Step S1304: the second image verification unit 209 compares the hash value obtained in step S1302 and the hash value obtained in step S1303, and determines whether the two hash values coincide with each other, in order to verify whether the selected image file has been altered. If the areas 501, 502, and 504 of the selected image file have not been altered, the two hash values coincide with each other. In this case, the main controller 210 determines "not altered", in other words, that the selected image file is an original.

If at least one of the areas 501, 502, and 504 of the selected image file has been altered, the two hash values do not coincide with each other. In this case, the main controller 210 determines "altered", in other words, the selected image file is not an original. The determination result of the second image verification unit 209 is sent to the main controller 210.

Step S1305: if the two hash values coincide with each other, the main controller 210 displays "OK" in the column for the verification result of the selected image file in the list window, as shown in FIG. 15. "OK" is information representing that the selected image file is an image file determined to be "not altered".

Step S1306: if the two hash values do not coincide with each other, the main controller 210 displays "NG" in the verification result column, as shown in FIG. 15. "NG" is information representing that the selected image file is an image file determined to have been "altered". If the selected image file is an image file determined to have been "altered", accessory information in the area 501 may have been altered. To notify the user that accessory information (for example, thumbnail image, photographing date & time, shutter speed, F-number, ISO sensitivity, size, model name, manufacturing number, and the like) obtained from the area 501 of the selected image file may have been altered, the main controller 210 changes the display form of the accessory information in the list window for the selected image file determined to have been "altered".

As change examples of the display form, the first to third display forms will be explained. In the first display form, all pieces of information displayed in the columns for the thumbnail, photographing date & time, shutter speed, F-number, ISO sensitivity, size, model name, and manufacturing number are erased. In the second display form, a sign (e.g., "×") representing the possibility of alteration is added to a thumbnail image displayed in the thumbnail column, and all pieces of information displayed in the columns for the photographing date & time, shutter speed, F-number, ISO sensitivity, size, model name, and manufacturing number are erased, for example, as shown in FIG. 15. In the third display form, a sign (e.g., "×") representing the possibility of alteration is added to all pieces of information displayed in the columns for the thumbnail, photographing date & time, shutter speed, F-number, ISO sensitivity, size, model name, and manufacturing number. Another display form can also be adopted as far as the display form can notify the user that accessory information of the selected image file may have been altered.

Step S1307: the main controller 210 determines whether all image files with digital signatures selected by the user have been verified. If NO in step S1307, the main controller 210 returns to step S1301.

By this processing sequence, the image verification apparatus 20 can verify whether an image file with a digital signature selected by the user has been altered.

In this manner, the image verification apparatus 20 according to the first embodiment can change the display form of accessory information (for example, thumbnail image, photographing date & time, shutter speed, F-number, ISO sensitivity, size, model name, manufacturing number, and the like) of an image file with an MAC determined to have been altered. The user can be notified in an easy-to-understand way of accessory information which may have been altered.

Also, the image verification apparatus 20 according to the first embodiment can change the display form of accessory information (for example, thumbnail image, photographing date & time, shutter speed, F-number, ISO sensitivity, size, model name, manufacturing number, and the like) of an image file with a digital signature determined to have been altered. The user can be notified in an easy-to-understand way of accessory information which may have been altered.

Second Embodiment

Figure 16:
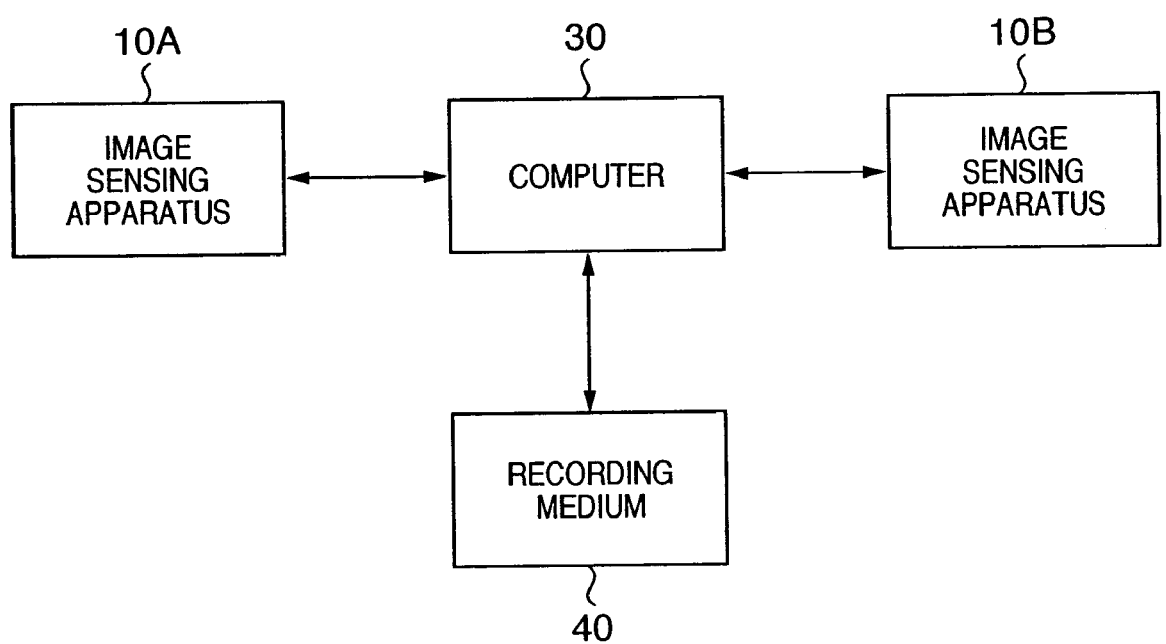
FIG. 16 is a block diagram for explaining the main building components of a control system according to the second embodiment.

The main building components of a control system according to the second embodiment of the present invention will be explained with reference to FIG. 16. The control system according to the second embodiment employs a computer 30 as a control apparatus which controls an image sensing apparatus 10A or 10B, instead of the image verification apparatus in the verification system according to the first embodiment described with reference to FIG. 1. The computer 30 controls the image sensing apparatuses 10A and 10B in accordance with a control program recorded on a recording medium 40. The computer 30 can function as an external apparatus 12A or 12B for the image sensing apparatus 10A or 10B, i.e., can communicate with a communication controller 107A of the image sensing apparatus 10A and a communication controller 107B of the image sensing apparatus 10B. The computer 30 can be implemented by the same arrangement as that of the image verification apparatus described in the first embodiment, and may have the function of the image verification apparatus.

The image sensing apparatuses 10A and 10B according to the second embodiment have a function of changing the contents of image files present in internal memories 103A and 103B or recording media 11A and 11B in accordance with an instruction from the computer 30. This function can be realized using image processors 102A and 102B by interpreting commands received via the communication controllers 107A and 107B by controllers 110A and 110B.

Figure 17:
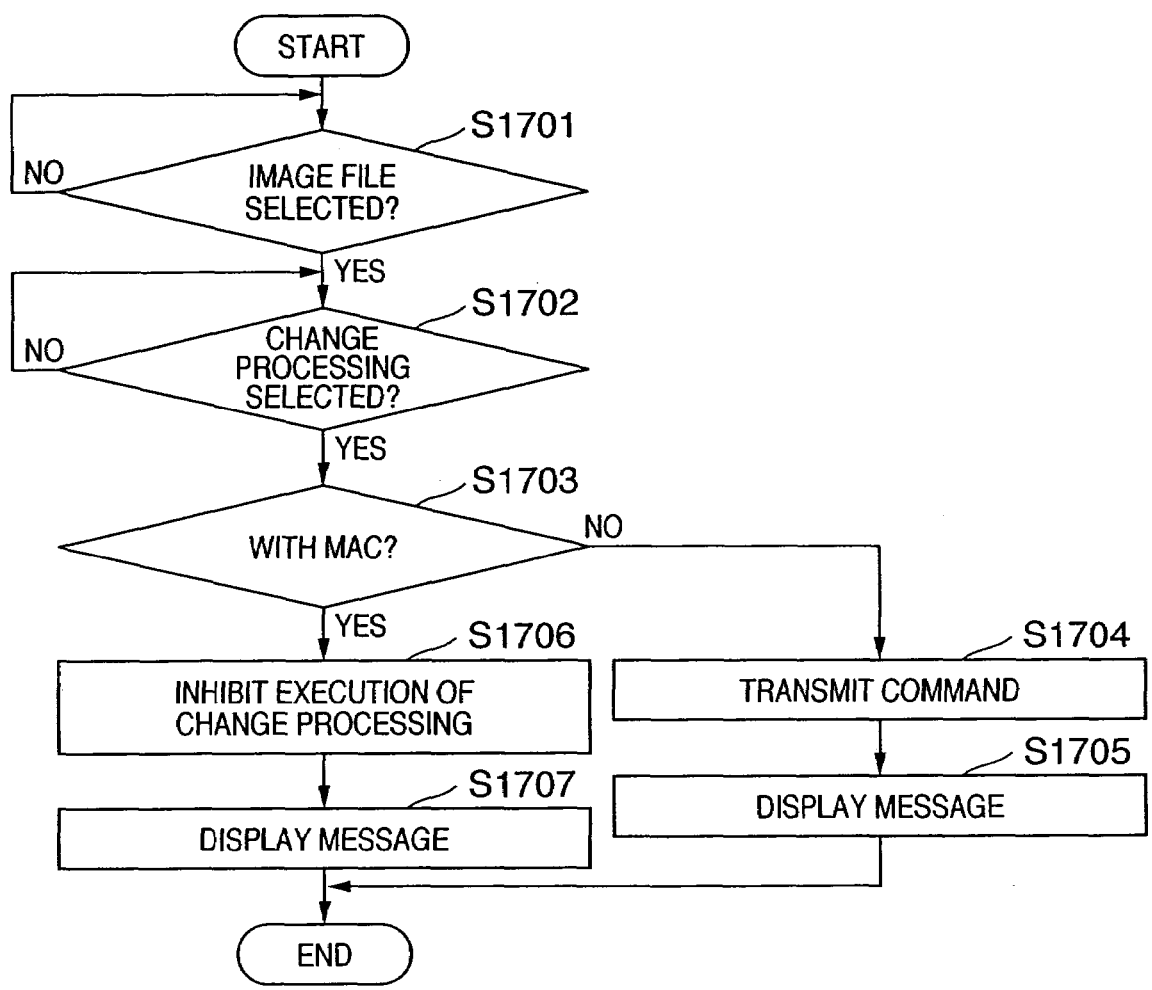
FIG. 17 is a flow chart for explaining an example of processing executed in a control system comprised of an image sensing apparatus 10A and computer 30 according to the second embodiment.

An example of processing executed in a control system comprised of the image sensing apparatus 10A and computer 30 will be explained with reference to the flow chart of FIG. 17.

The computer 30 inquires, e.g., the contents of an image file in the recording medium 11A of the image sensing apparatus 10A. The image sensing apparatus 10A acquires and sends back pieces of information (e.g., the file name and reduced image of each image file) necessary to create a list window for image files in the recording medium 11A. Using these pieces of information, the computer 30 displays a list window capable of selecting an image file on a display 212.

Step S1701: whether the user has selected one image file from the list window via an operation unit 213 is determined. If YES in step S1701, the computer 30 advances to step S1702. An image file selected by the user will be called a "selected image file".

Step S1702: the computer 30 determines whether the user has selected one change process from a plurality of change processes provided on, e.g., a menu window or context menu (menu displayed by mouse clicking). In this case, development processing, recompression processing, or size change processing can be selected as the change process.

Development processing can be selected when the selected image file is a RAW image file (image file recorded in the RAW format). A digital image in the selected image file is adjusted in accordance with image adjustment parameters input by the user to the computer 30. The adjusted digital image is compressed in the JPEG format.

Recompression processing can be selected when the selected image file is a JPEG image file (image file recorded in the JPEG format). The compression ratio of a digital image in the selected image file is changed to a compression ratio input by the user to the computer 30. The compression ratio selectable in recompression processing is smaller than the original compression ratio of the selected image file.

Size change processing can be selected when the selected image file is a JPEG image file. The size (number of pixels) of a digital image in the selected image file is changed to a size (number of pixels) input by the user to the computer 30. The size selectable in size change processing is smaller than the original size of the selected file.

If any change processing is selected in step S1702, the flow advances to step S1703.

Step S1703: the computer 30 causes, e.g., the image sensing apparatus 10A to examine whether an MAC has been added to the selected image file. The image sensing apparatus 10A examines the selected image file in the recording medium 11A in accordance with an instruction from the computer 30, determines the presence/absence of an MAC, and notifies the computer 30 of the determination result. If no MAC is added to the selected image file, the flow advances to step S1704; if an MAC is added to the selected image file, to step S1706.

Step S1704: the computer 30 generates a command (instruction) which requests to change the contents of the selected image file in accordance with change processing selected by the user, and transmits the generated command to the image sensing apparatus 10A. This command contains information which specifies the selected image file, and information necessary for change processing selected by the user. The controller 110A receives the command by using the communication controller 107A, and changes the contents of the selected image file in accordance with the command. After changing the contents of the selected image file, the controller 110A sends back, to the computer 30 by using the communication controller 107A, a response representing that the contents of the selected image file have been changed.

Step S1705: the computer 30 receives the response from the image sensing apparatus 10A, and then displays, on the display 212 of the computer 30, a message that change processing selected by the user has been executed.

Step S1706: the computer 30 inhibits execution of change processing selected by the user in order to prevent any change of the contents of the selected image file. At this time, the computer 30 does not generate any command (instruction) which requests to change the contents of the selected image file in accordance with change processing selected by the user, and does not transmit any command to the image sensing apparatus 10A.

Step S1707: the computer 30 displays on the display 212 a message which notifies the user that change processing selected by the user cannot be executed.

In this manner, when an MAC has been added to a selected image file, the computer 30 according to the second embodiment inhibits transmission, to the image sensing apparatus 10A, of a command (instruction) which requests to change the contents of the selected image file in accordance with change processing selected by the user. This can prevent the image sensing apparatus 10A from changing the contents of the selected image file (with the MAC) in accordance with an instruction from the computer 30.

Figure 18:
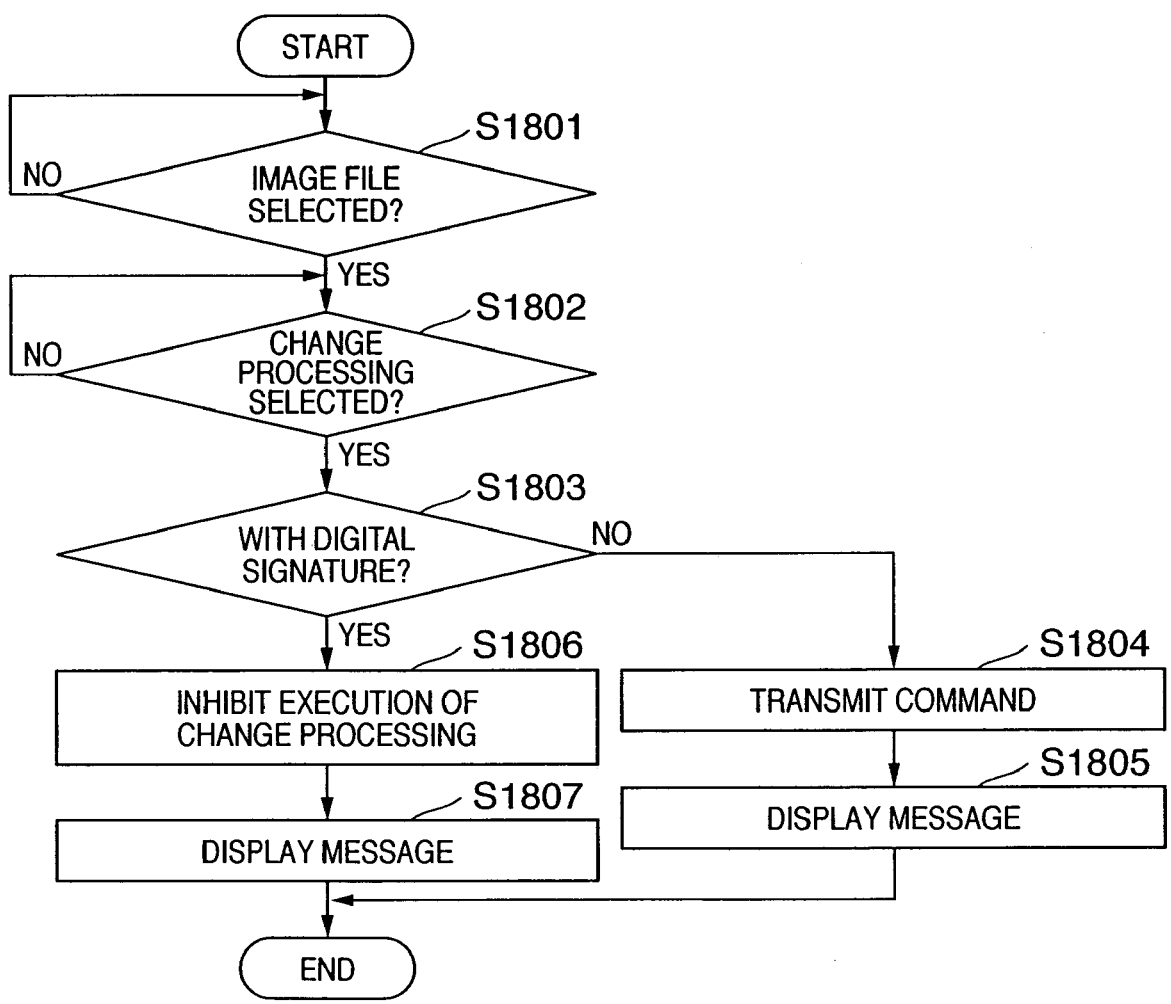
FIG. 18 is a flow chart for explaining an example of processing executed in a control system comprised of an image sensing apparatus 10B and computer 30 according to the second embodiment.

An example of processing executed in a control system comprised of the image sensing apparatus 10B and computer 30 will be explained with reference to the flow chart of FIG. 18.

Step S1801: the computer 30 determines whether the user has selected one image file from the recording medium 11B. If YES in step S1801, the computer 30 advances to step S1802. An image file selected by the user will be called a "selected image file".

Step S1802: the computer 30 determines whether the user has selected one change process from a plurality of change processes. As described above, development processing, recompression processing, or size change processing can be selected.

If any change processing is selected in step S1802, the flow advances to step S1803.

Step S1803: in the same way as that for the image sensing apparatus 10A, the computer 30 determines whether a digital signature has been added to the selected image file. If no digital signature is added to the selected image file, the flow advances to step S1804; if a digital signature is added to the selected image file, to step S1806.

Step S1804: the computer 30 generates a command (instruction) which requests to change the contents of the selected image file in accordance with change processing selected by the user, and transmits the generated command to the image sensing apparatus 10B. This command contains information which specifies the selected image file, and information necessary for change processing selected by the user. The controller 110B receives the command by using the communication controller 107B, and changes the contents of the selected image file in accordance with the command. After changing the contents of the selected image file, the controller 110B sends back, to the computer 30 by using the communication controller 107B, a response representing that the contents of the selected image file have been changed.

Step S1805: the computer 30 receives the response from the image sensing apparatus 10B, and then displays, on the display of the computer 30, a message that change processing selected by the user has been executed.

Step S1806: the computer 30 inhibits execution of change processing selected by the user in order to prevent any change of the contents of the selected image file. At this time, the computer 30 does not generate any command (instruction) which requests to change the contents of the selected image file in accordance with change processing selected by the user, and does not transmit any command to the image sensing apparatus 10B.

Step S1807: the computer 30 displays on the display 212 a message which notifies the user that change processing selected by the user cannot be executed.

As described above, when a digital signature has been added to a selected image file, the computer 30 according to the second embodiment inhibits transmission, to the image sensing apparatus 10B, of a command (instruction) which requests to change the contents of the selected image file in accordance with change processing selected by the user. This can prevent the image sensing apparatus 10B from changing the contents of the selected image file (with the digital signature) in accordance with an instruction from the computer 30.

Third Embodiment

The first embodiment can be changed to an embodiment which verifies whether an image file has been altered before accessory information (for example, thumbnail image, photographing date & time, shutter speed, F-number, ISO sensitivity, size, model name, manufacturing number, and the like), file name, and size of the image file with an MAC are displayed.

Similarly, the first embodiment can be changed to an embodiment which verifies whether an image file has been altered before accessory information (for example, thumbnail image, photographing date & time, shutter speed, F-number, ISO sensitivity, size, model name, manufacturing number, and the like), file name, and size of the image file with a digital signature are displayed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As has been described above, the present invention can prevent an image sensing apparatus from changing the contents of an image file (with verification data) in accordance with an instruction from a control apparatus.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus which controls an image sensing apparatus, comprising:
   a determination unit which determines whether or not verification data has been added to an image file, wherein the verification data is used to determine whether or not a digital image in the image file has been altered;
   a command generating unit which generates a command that requests the image sensing apparatus to change the contents of the image file; and
   a command sending unit which sends the command to the image sensing apparatus if said determination unit determines that the verification data has not been added to the image file whereas the command is not sent to the image sensing apparatus if said determination unit determines that the verification data has been added to the image file.

2. The control apparatus according to claim 1, wherein said control apparatus displays a message indicating that the contents of the image file cannot be changed, if said determination unit determines that the verification data has been added to the image file.

3. The control apparatus according to claim 1, wherein the verification data is generated using cryptography in which an encryption key and a decryption key are identical.

4. The control apparatus according to claim 1, wherein the verification data is generated using cryptography in which an encryption key and a decryption key are different.

5. A method of controlling an image sensing apparatus, said method comprising the steps of:

determining whether or not verification data has been added to an image file, wherein the verification data is used to determine whether or not a digital image in the image file has been altered;

generating a command that requests the image sensing apparatus to change the contents of the image file; and sending the command to the image sensing apparatus if it is determined in said determining step that the verification data has not been added to the image file whereas the command is not sent to the image sensing apparatus if it is determined in said determining step that the verification data has been added to the image file.

6. The method according to claim 5, further comprising the step of:

displaying a message indicating that the contents of the image file cannot be changed, if it is determined in said determining step that the verification data has been added to the image file.

7. The method according to claim 5, wherein the verification data is generated using cryptography in which an encryption key and a decryption key are identical.

8. The method according to claim 5, wherein the verification data is generated using cryptography in which an encryption key and a decryption key are different.

9. A computer readable medium which stores a program causing a computer to perform a method of controlling an image sensing apparatus, the method comprising the steps of:

determining whether or not verification data has been added to an image file, wherein the verification data is used to determine whether or not a digital image in the image file has been altered;

generating a command that requests the image sensing apparatus to change the contents of the image file; and sending the command to the image sensing apparatus if it is determined in the determining step that the verification data has not been added to the image file whereas the command is not sent to the image sensing apparatus if it is determined in the determining step that the verification data has been added to the image file.

10. The computer readable medium according to claim 9, wherein the method further comprising the step of:

displaying a message indicating that the contents of the image file cannot be changed, if it is determined in the determining step that the verification data has been added to the image file.

11. The computer readable medium according to claim 9, wherein the verification data is generated using cryptography in which an encryption key and a decryption key are identical.

12. The computer readable medium according to claim 9, wherein the verification data is generated using cryptography in which an encryption key and a decryption key are different.

* * * * *

UNITED STATES PATENT AND TRADEMARK OFFICE
CERTIFICATE OF CORRECTION

PATENT NO. : 7,298,932 B2  Page 1 of 1
APPLICATION NO. : 10/834662
DATED : November 20, 2007
INVENTOR(S) : Satoru Wakao It is certified that error appears in the above-identified patent and that said Letters Patent is hereby corrected as shown below:

On the Title Page, before "(51) Int. Cl." insert:
 --(30) Foreign Priority Data
 Apr 30, 2003 (JP) ……..2003-125315--.

Signed and Sealed this

First Day of April, 2008

JON W. DUDAS
*Director of the United States Patent and Trademark Office*